(12) United States Patent
Schleif et al.

(10) Patent No.: US 9,778,144 B2
(45) Date of Patent: Oct. 3, 2017

(54) SYSTEMS AND METHODS FOR ATTACHING A PROBE TO A CASING OF A GAS TURBINE ENGINE

(71) Applicant: General Electric Company, Schenectady, NY (US)

(72) Inventors: Kurt Kramer Schleif, Greenville, SC (US); Zachary John Snider, Simpsonville, SC (US); Nathan Lee Brown, Simpsonville, SC (US); Andrea Booher Kretschmar, Simpsonville, SC (US); Michael Allen Ball, Mount Juliet, TN (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 486 days.

(21) Appl. No.: 14/489,759

(22) Filed: Sep. 18, 2014

(65) Prior Publication Data

US 2016/0084736 A1    Mar. 24, 2016

(51) Int. Cl.
*F01D 17/02* (2006.01)
*G01M 15/14* (2006.01)
*G01D 11/30* (2006.01)

(52) U.S. Cl.
CPC ............. *G01M 15/14* (2013.01); *F01D 17/02* (2013.01); *G01D 11/30* (2013.01)

(58) Field of Classification Search
CPC .......... F01D 17/02; F01D 17/04; F01D 17/06; F01D 17/08; F01D 17/085; G01M 15/14; G01D 11/30
See application file for complete search history.

(56) References Cited

U.S. PATENT DOCUMENTS

| | | | | |
|---|---|---|---|---|
| 3,751,305 | A | * | 8/1973 | Huebscher ............... G01K 1/14 136/221 |
| 3,936,217 | A | * | 2/1976 | Travaglini ............ F01D 21/003 415/118 |
| 4,018,083 | A | | 4/1977 | Hoffman |
| 4,495,810 | A | | 1/1985 | Tessarzik et al. |
| 4,614,443 | A | * | 9/1986 | Hamert .................. G01K 1/146 136/221 |
| 4,907,456 | A | | 3/1990 | Rozelle |
| 4,919,099 | A | | 4/1990 | Extance et al. |
| 5,115,636 | A | * | 5/1992 | Zeiser ................... F01D 21/003 415/118 |
| 5,185,996 | A | * | 2/1993 | Smith ................... F01D 17/085 374/144 |
| 5,349,850 | A | | 9/1994 | Young |

(Continued)

*Primary Examiner* — Gregory Anderson
*Assistant Examiner* — Eldon Brockman
(74) *Attorney, Agent, or Firm* — Eversheds Sutherland (US) LLP

(57) ABSTRACT

A system for attaching a probe to a casing of a gas turbine engine is disclosed. The system may include a probe receptacle attachable to the casing. The probe receptacle may include an internal bore, a bayonet slot, a spring disposed within the internal bore adjacent to the bayonet slot, and a sealing surface within the internal bore. The system also may include a probe attachment assembly disposed about the probe and configured to engage the probe receptacle. The probe attachment assembly may include at least one bayonet positionable within the bayonet slot and a seal positionable adjacent to the sealing surface within the internal bore.

14 Claims, 9 Drawing Sheets

(56) References Cited

U.S. PATENT DOCUMENTS

| 5,718,512 | A | * | 2/1998 | Ngo-Beelmann | G01K 13/02 136/230 |
|---|---|---|---|---|---|
| 8,039,729 | B2 | * | 10/2011 | Nguyen | F23N 5/107 136/221 |
| 9,512,737 | B2 | * | 12/2016 | Hatcher, Jr. | F01D 21/003 |
| 2009/0067916 | A1 | * | 3/2009 | Busse et al. | G01D 11/245 403/2 |
| 2015/0125267 | A1 | * | 5/2015 | Hatcher, Jr. | F01D 21/003 415/118 |

* cited by examiner

SYSTEMS AND METHODS FOR ATTACHING A PROBE TO A CASING OF A GAS TURBINE ENGINE

FIELD OF THE DISCLOSURE

The disclosure generally relates to a probe and more particularly relates to systems and methods for attaching a probe to a casing of a gas turbine engine.

BACKGROUND

Attaching probes to a casing of a gas turbine engine can be problematic, particularly when threading the probe into the casing where limited space is available and/or the line of sight is obstructed. For example, threading a probe into a threaded probe receptacle can be very difficult to do if the probe is very long. Anytime a threaded connection is used, there is a possibility of cross-threading. If cross-threading occurs in the probe receptacle, it may not be accessible for repair. Similarly, there is a possibility of the threads seizing. If seizing occurs, the probe may be indefinitely stuck in the probe receptacle and may not be accessible for repair. Threaded connections can also back-out, causing structural issues and/or leaks. Moreover, with threaded connections, it is often difficult to precisely position the probe.

SUMMARY

Some or all of the above needs and/or problems may be addressed by certain embodiments disclosed herein. In one embodiment, a system for attaching a probe to a casing of a gas turbine engine is disclosed. The system may include a probe receptacle attachable to the casing. The probe receptacle may include an internal bore, a bayonet slot, a spring disposed within the internal bore, and a sealing surface within the internal bore. The system also may include a probe attachment assembly disposed about the probe and configured to engage the probe receptacle. The probe attachment assembly may include at least one bayonet positionable within the bayonet slot and a seal positionable adjacent to the sealing surface within the internal bore.

In another embodiment, a system for attaching one or more instruments to a casing of a gas turbine engine is disclosed. The system may include a probe. The system also may include a probe receptacle attachable to the casing. The probe receptacle may include an internal bore, a bayonet slot, a spring disposed within the internal bore, and a sealing surface within the internal bore. The system also may include a probe attachment assembly disposed about the probe and configured to engage the probe receptacle. The probe attachment assembly may include at least one bayonet positionable within the bayonet slot and a seal positionable adjacent to the sealing surface within the internal bore.

In another embodiment, a system for attaching a probe to a casing of a gas turbine engine is disclosed. The system may include a probe receptacle attachable to the casing. The probe receptacle may include a casing seal portion attachable to the casing, a main body attachable to the casing seal portion, and a cap attachable to the main body. The cap may include a bayonet slot and a spring. The main body may include a sealing surface. The system also may include a probe attachment assembly disposed about the probe and configured to engage the probe receptacle. The probe attachment assembly may include a busing and seal disposed about the probe. The bushing may include at least one bayonet positionable within the bayonet slot. The seal may be positionable adjacent to the sealing surface.

Other features and aspects of the systems and methods disclosed herein will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

FIGS. 1-9 schematically depict various embodiments of a system 100 for attaching a probe 102 to a casing 104 of a gas turbine engine 106. In some instances, the probe 102 may be positioned downstream of a combustor of the gas turbine engine 106. The system 100 may be used at any location about the gas turbine engine 106.

Figure 1:
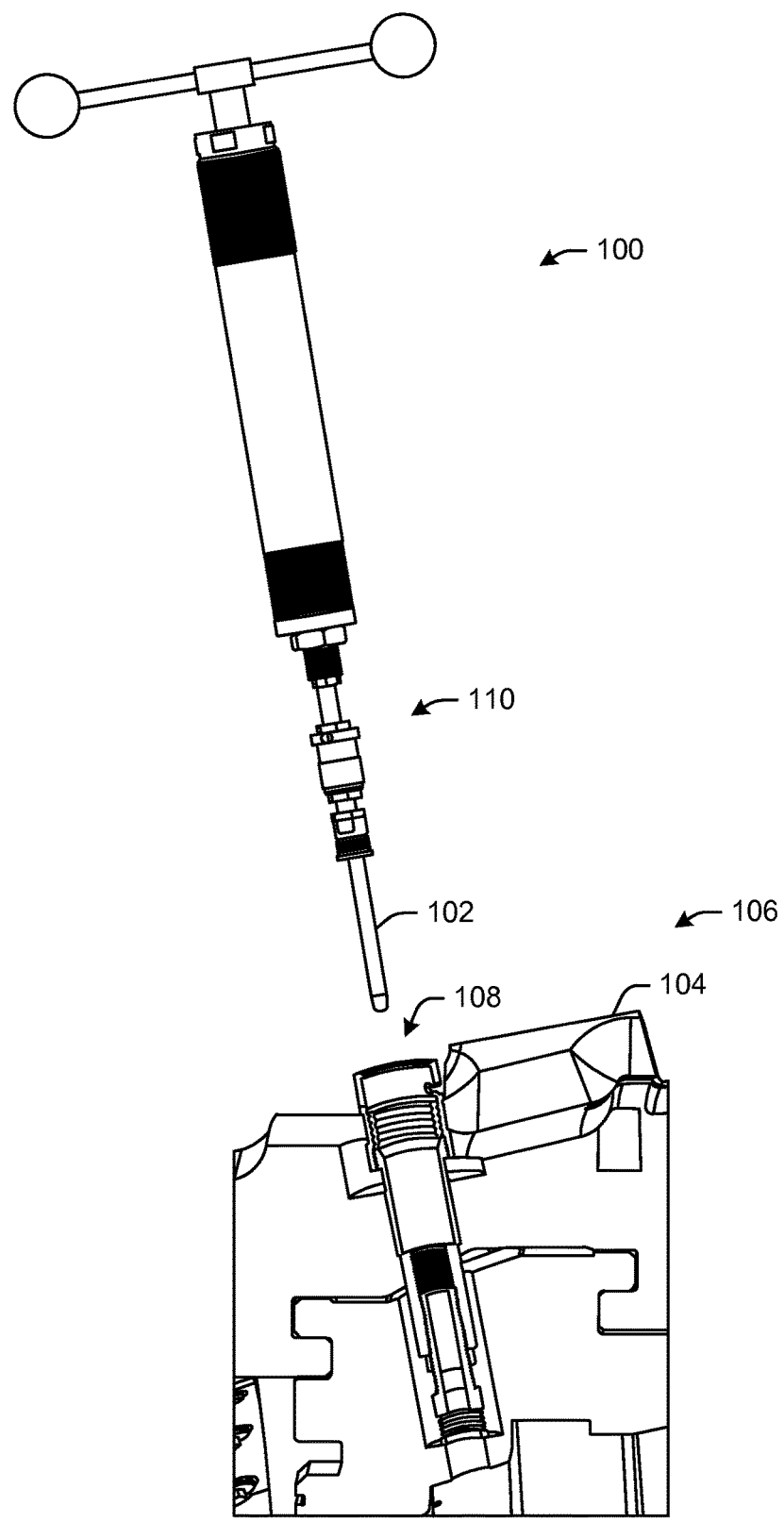
FIG. 1 schematically depicts a system in accordance with one or more embodiments of the disclosure.
Figure 2:
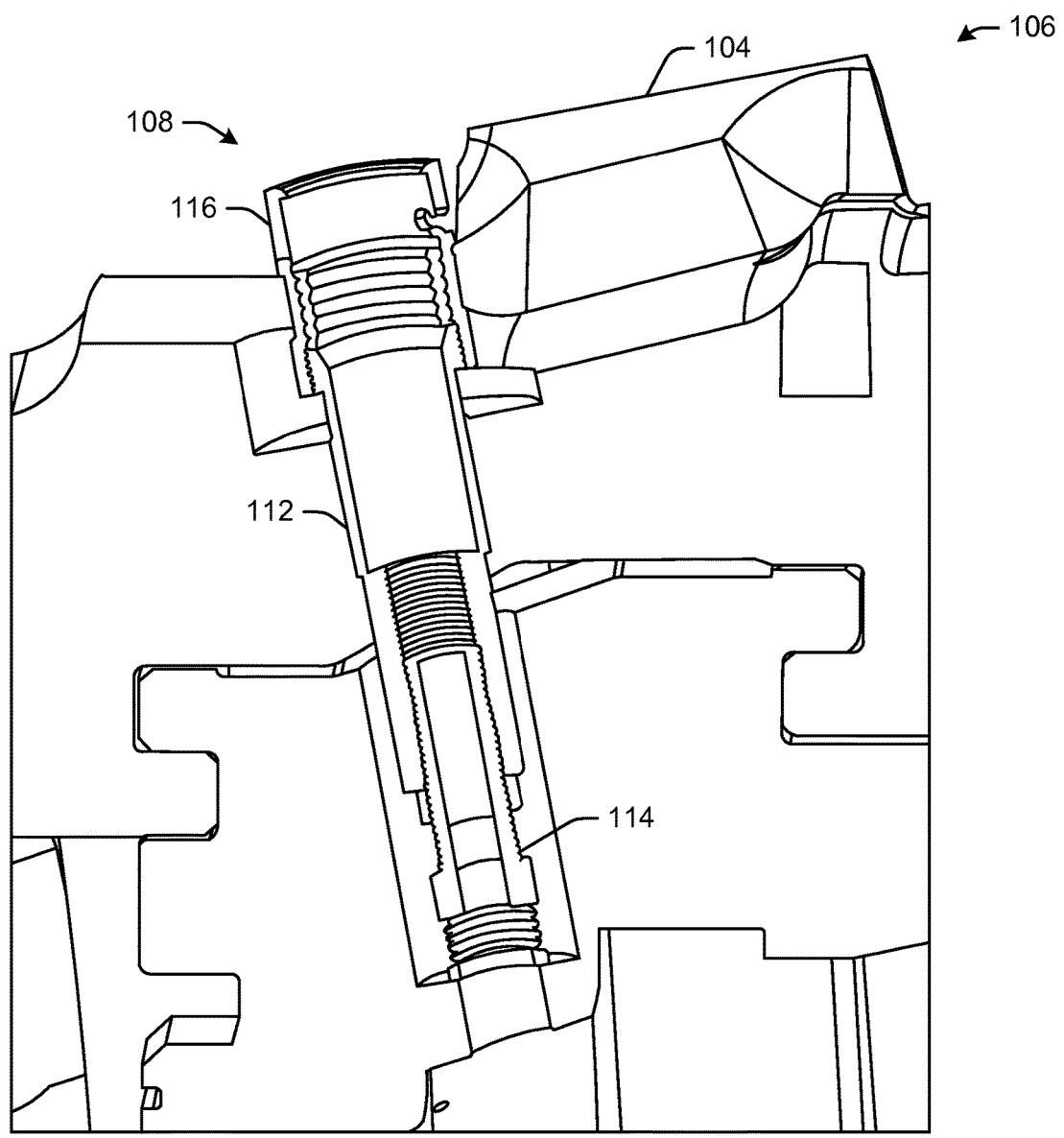
FIG. 2 schematically depicts a probe receptacle in accordance with one or more embodiments of the disclosure.
Figure 3:
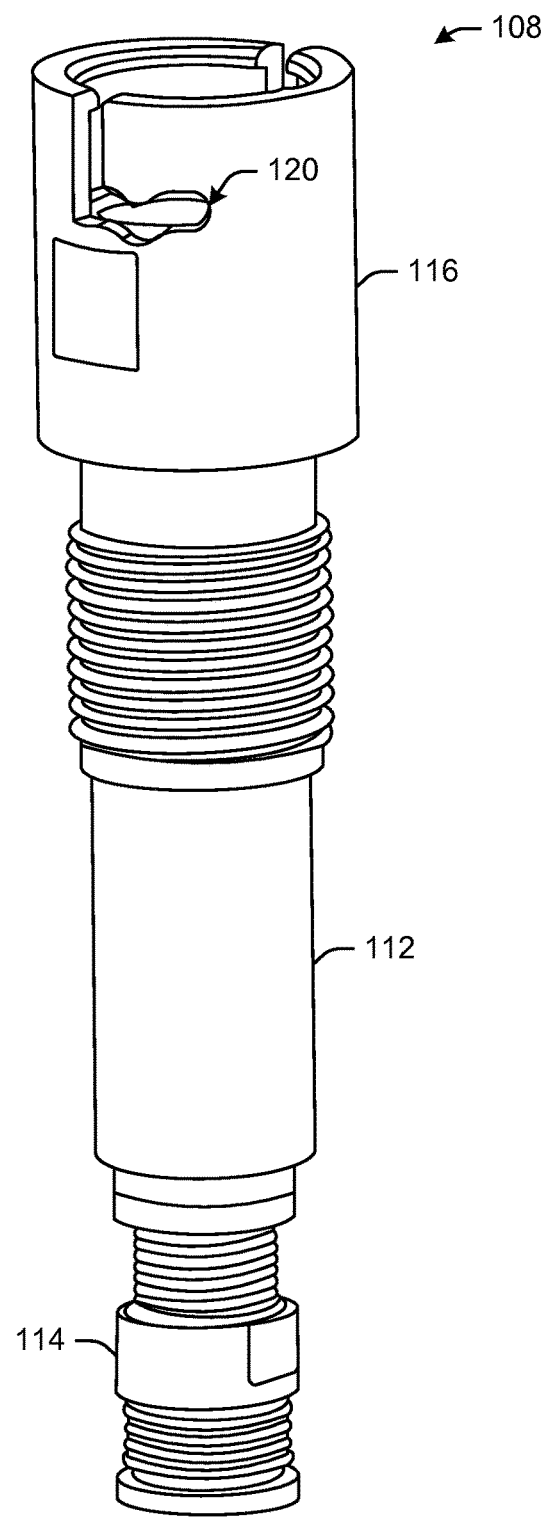
FIG. 3 schematically depicts a probe receptacle in accordance with one or more embodiments of the disclosure.

Generally speaking, the system 100 may include a probe receptacle 108 and a probe attachment assembly 110. The probe receptacle 108 may be attached to the casing 104 of the gas turbine engine 106. In some instances, the probe receptacle 108 may be embedded within the casing 104. As depicted in FIGS. 2 and 3, the probe receptacle 108 may include a main body 112, a casing seal portion 114, and/or a cap 116. The cap 116 may be attached to the main body 112 opposite the casing seal portion 114. The cap 116 and casing seal portion 114 may be threaded or the like to the main body 112. Moreover, the cap 116, the main body 112, and/or the casing seal portion 114 may be attached to the casing 104 of the gas turbine engine 106. For example, the cap 116, the main body 112, and/or the casing seal portion 114 may be threaded into the casing 104. In some instances, the probe receptacle 108 may be embedded within the casing 104 or formed as an integral component of the casing 104. The casing seal portion 114 may form a seal between the probe receptacle 108 and the casing 104 of the gas turbine engine 106.

Figure 4:
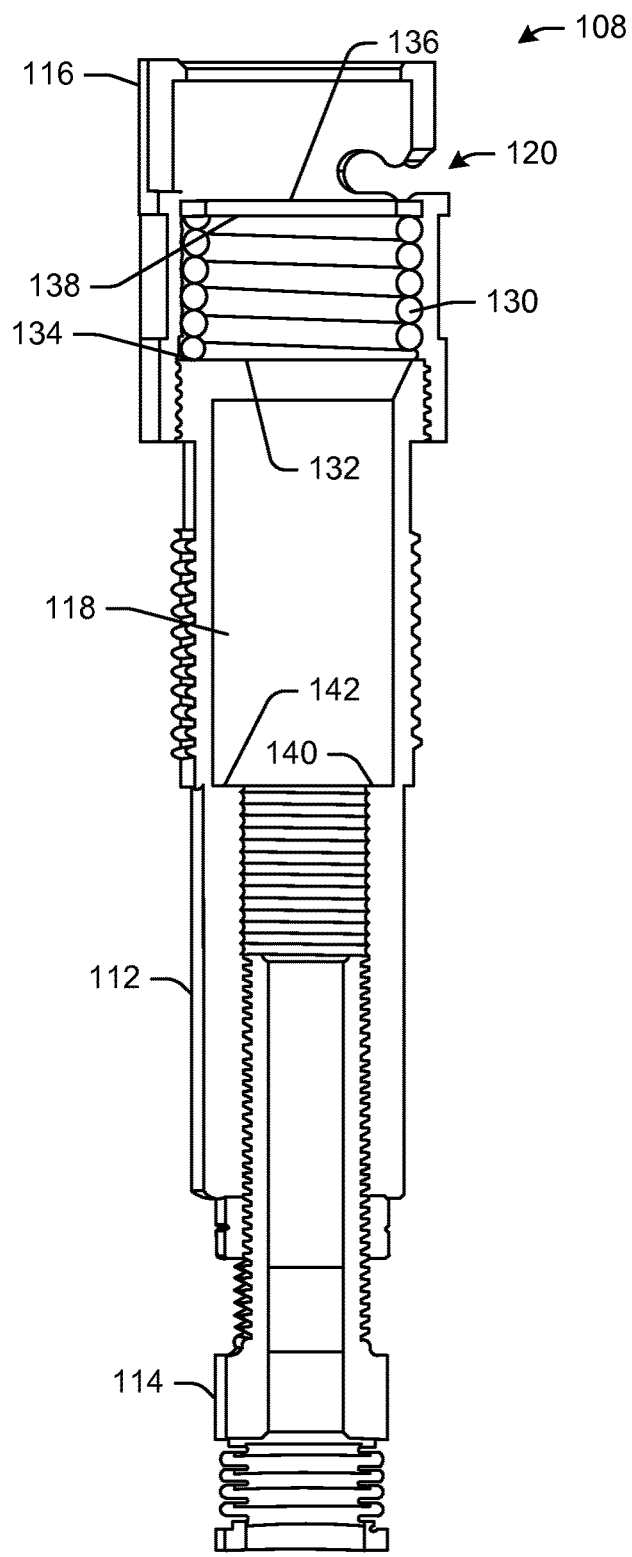
FIG. 4 schematically depicts a probe receptacle in accordance with one or more embodiments of the disclosure.

As depicted in FIG. 4, the probe receptacle 108 may include an internal bore 118. The internal bore 118 may extend through the cap 116, the main body 112, and/or the casing seal portion 114. The internal bore 118 may provide a passageway for the probe 102 and the probe attachment assembly 110 to move through the probe receptacle 108. The size and shape of the internal bore 118 may correspond to the probe 102 and/or the probe attachment assembly 110.

Figure 8:
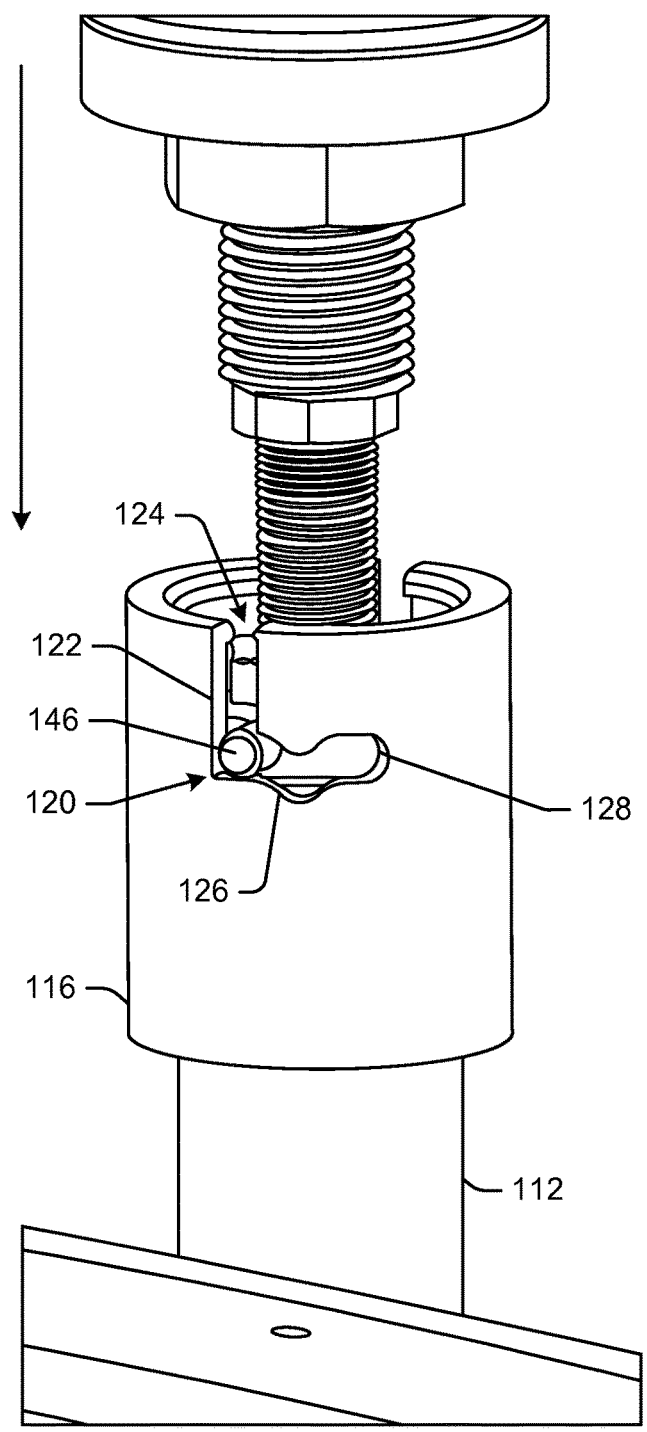
FIG. 8 schematically depicts a system in accordance with one or more embodiments of the disclosure.
Figure 9:
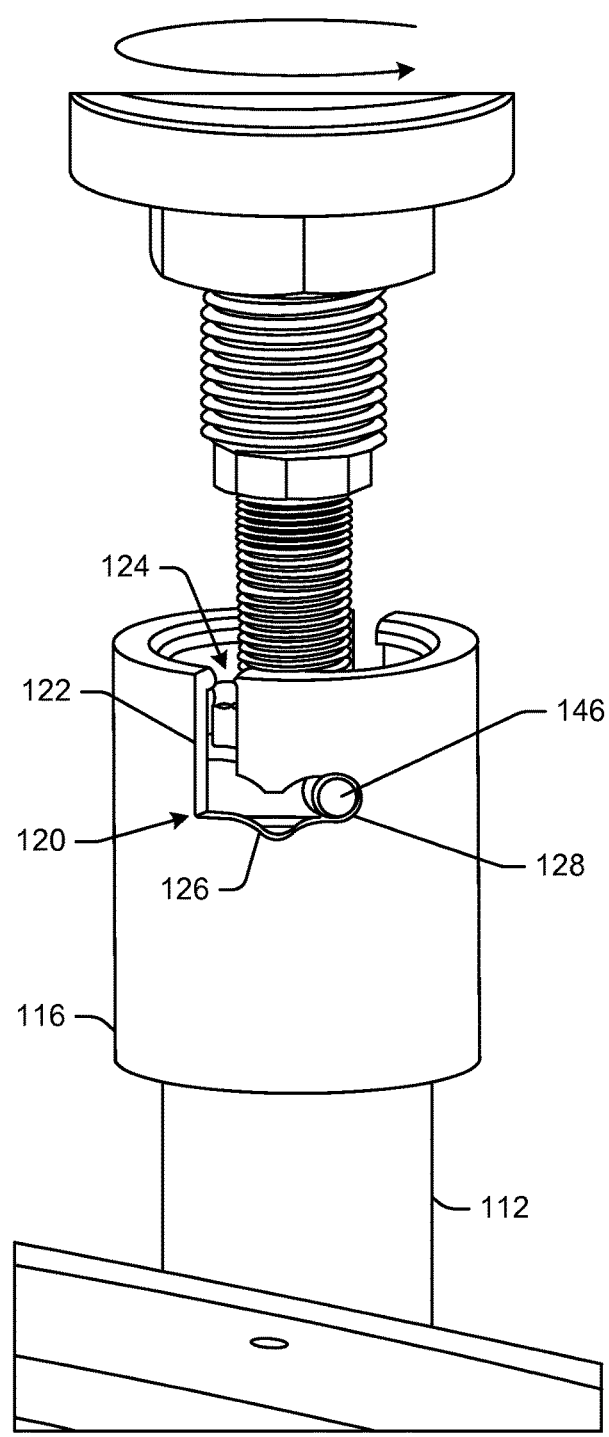
FIG. 9 schematically depicts a system in accordance with one or more embodiments of the disclosure.

The probe receptacle 108 may include a bayonet slot 120. In some instances, the bayonet slot 120 may be disposed within the cap 116. The bayonet slot 120 may include multiple portions that form a path along the cap 116. For example, as depicted in FIGS. 8 and 9, the bayonet slot 120 may include a first portion 122 extending from an opening 124 in a substantially axial direction relative to the probe 102. At a bottom of the first portion 122, the bayonet slot 120 may include a second portion 126 in the circumferential direction. The bayonet slot 120 also may include a third portion 128, such as a notch, at and end of the second portion 126 that is oriented axially in the opposite direction of the first portion 122. For example, the bayonet slot 120 may be generally J-shaped. The length of the third portion 128 may be equal to or less than a diameter of a bayonet. In other instances, the bayonet slot 120 may be generally L-shaped. The bayonet slot 120 may be any shape. In some instances, the third portion 128 may be omitted, and an external anti-rotation means may be used. For example, the probe 102 may be secured on the outside of the casing to prevent rotation.

Referring back to FIG. 4, the probe receptacle 108 may include a spring 130 disposed within the internal bore 118 adjacent to the bayonet slot 120. In some instances, the spring 130 may be positioned within the cap 116. A bottom portion 132 of the spring 120 may abut an upper lip 134 of the main body 112. In some instances, a washer 136 may be disposed within the internal bore 118 adjacent to the spring 130 and the bayonet slot 120. For example, the washer 136 may be positioned on a top portion 138 of the spring 130. In some instances, the washer may be omitted. In some instances, the spring 130 may be omitted. As described below, the bellows seal 150 may act as a spring when compressed. In this manner, the bellows seal 150 may include enough spring stiffness to provided suitable resistance on the bayonet 146.

The probe receptacle 108 may include a sealing surface 140 within the internal bore 118. In some instances, the sealing surface 140 may be a lip 142 within the main body 112.

Figure 5:
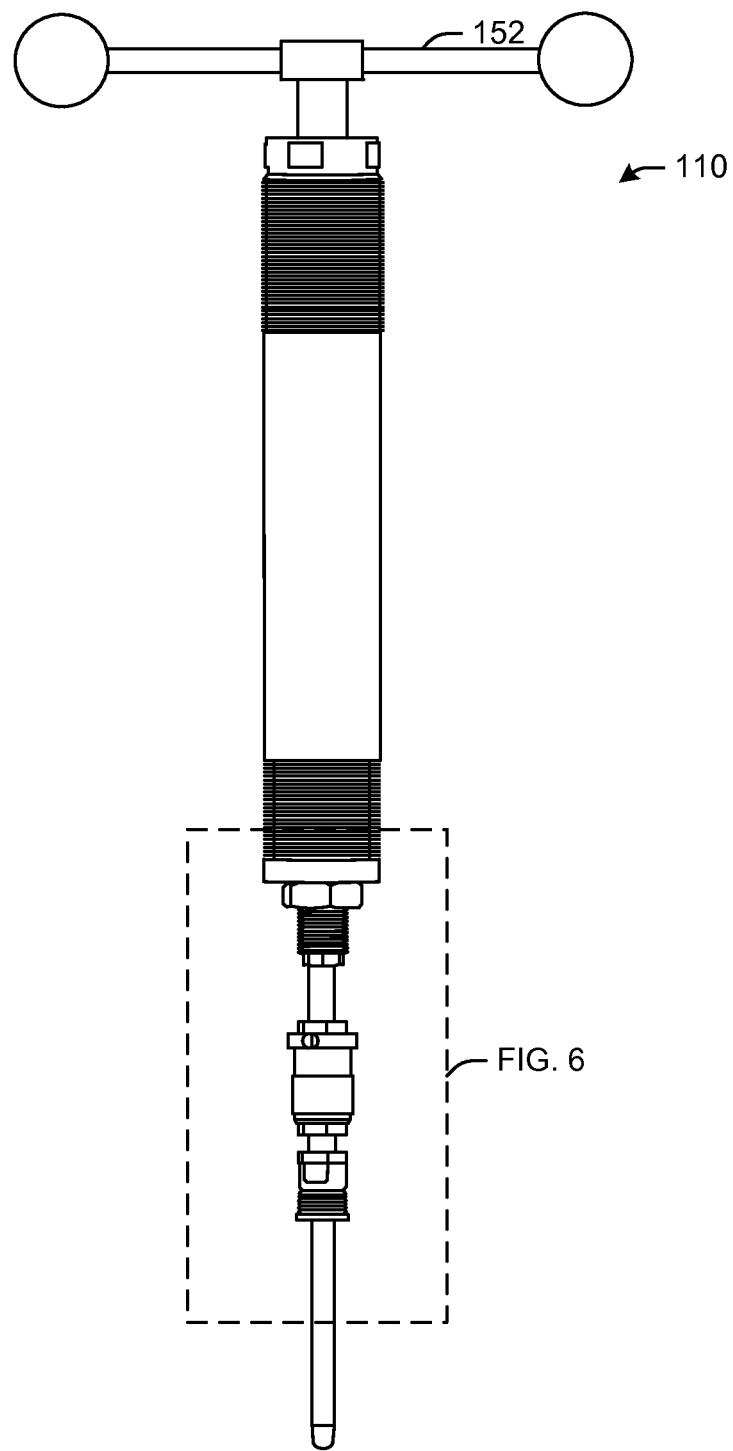
FIG. 5 schematically depicts a probe attachment assembly in accordance with one or more embodiments of the disclosure.
Figure 6:
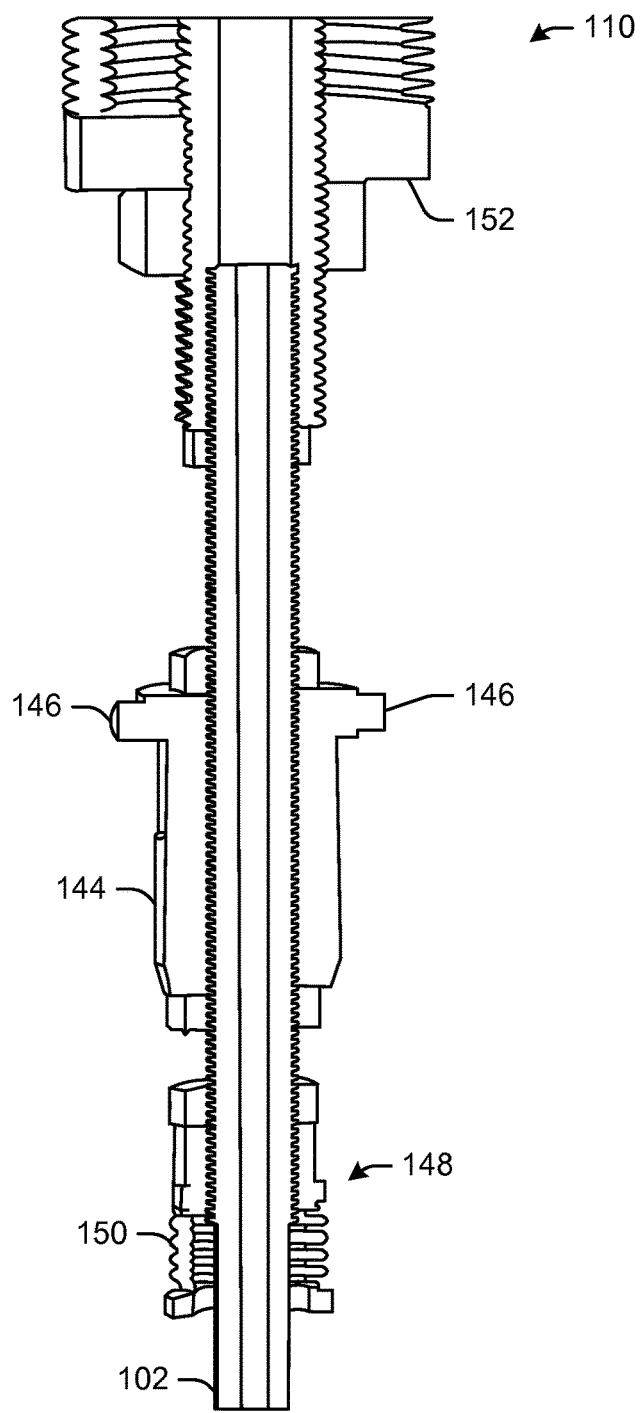
FIG. 6 schematically depicts a probe attachment assembly in accordance with one or more embodiments of the disclosure.
Figure 7:
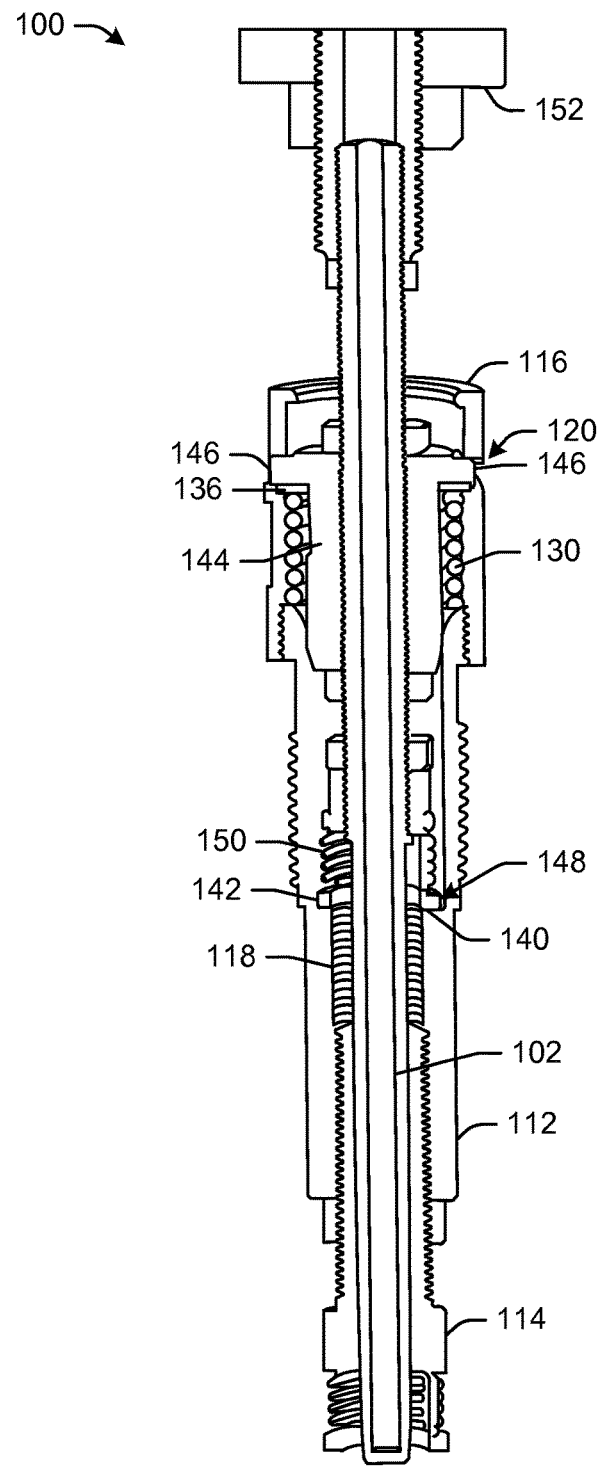
FIG. 7 schematically depicts a system in accordance with one or more embodiments of the disclosure.

As depicted in FIGS. 5-7, the probe attachment assembly 110 may be disposed about the probe 102. That is, the various components of the probe attachment assembly 110 may be attached to the probe 102. For example, the probe attachment assembly 110 may be threaded onto the probe 102. The probe attachment assembly 110 may be inserted into the probe receptacle 108 via the internal bore 118 and rotated to secure the probe 102 in place.

The probe attachment assembly 110 may include a bushing 144 disposed about the probe 102. The bushing 144 may include at least one bayonet 146. The bayonet 146 may be a protrusion or the like extending outward from the bushing 144. In some instances, the at least one bayonet 146 may include two bayonets spaced 180 degrees apart. Any number of bayonets may be used herein. The bayonet 146 may be positioned within the bayonet slot 120. That is, for each bayonet 146, there may be a corresponding bayonet slot 120. The spring 130 may maintain the bayonet 146 within the bayonet slot 120. Moreover, the bayonet slot 120 may be shaped to provide tactile responses based on one or more locations of the bayonet 146 within the bayonet slot 120. For example, when the bayonet 146 enters the third portion 128 of the bayonet slot 120 (i.e., the notch), an operator may feel a tactile response due to the spring 130 applying force on the bayonet 146 and forcing the bayonet 146 into the notch. The spring 130 may maintain the bayonet 146 within the notch until a sufficient counter force is applied.

The probe attachment assembly 110 also may include and a seal 148. The seal 148 may be positioned adjacent to the sealing surface 140 within the internal bore 118. That is, the seal 148 may engage the lip 142 within the main body 112. In this manner, the seal 148 may form a seal at the sealing surface 140 within the internal bore 118. In some instances, the seal may be a bellows seal 150. For example, the bellows seal 150 may be a corrugated sheet metal part that compresses under load forming a seal. Other types of seals may be used herein. As noted above, the bellows seal 150 may act as a spring to keep the bayonet 146 within the slot 120.

The probe attachment assembly 110 further may include a handle 152 for installing the probe 102 into the probe receptacle 108. The handle 152 may be attachable to the probe 102. The handle 152 may be application specific. That is, the size and shape of the handle 152 may vary. For example, the handle 152 may be configured to pass through the outer casing of the gas turbine engine for attaching the probe to the inner casing of the gas turbine engine. The handle 152 may facilitate a user inserting and/or removing the probe 102 from the probe receptacle 108. The handle 152 also may facilitate an operator rotating the probe 102 within the probe receptacle 108. Moreover, the handle 152 can be locked in place, thereby preventing rotation of the probe 102, if, for example, the third portion 128 of the slot 120 is omitted. Anti-rotation may prevent unintended disengagement of the probe 102 from the probe receptacle 108.

In use, the probe 102 is inserted into the probe receptacle 108 and rotated to lock it in place. During the insertion and rotation of the probe 102, the bellows seal 150 may engage the sealing surface 140 to prevent leakage around the probe 102. The probe 102 may be removed by rotating it in the opposite direction and pulling it out.

As the probe 102 is inserted into the probe receptacle 108, an operator may rotate the probe 102 until the bayonet 146 finds the opening 124 to the bayonet slot 120 so that the bayonet slot 120 may capture the bayonet 146. This operation can be done blindly, i.e., strictly by feel. Once the bayonet 146 is initially positioned in the bayonet slot 120, the operator may push down on the probe 102 in the axial direction to overcome the spring 130 in the probe receptacle 108. In some instances, the spring rate of the spring 130 may be high enough to prevent accidental (or unintended) disengagement but also low enough that the operator can overcome the spring 130 during installation and removal.

The operator may push down on the probe 102 until the bayonet 146 bottoms out in the first portion 122 of the bayonet slot 120. The operator may then turn the probe 102 until the bayonet 146 reaches the end of the second portion 126 of the bayonet slot 120. The operator may then remove pressure on the probe handle 152, allowing the spring 130 to drive the bayonet 146 into the third portion 128 (i.e., the notch) of the bayonet slot 120. Once seated in the notch, the bayonet 146 is captured and the probe 102 cannot move axially or circumferentially (unless an external force on the probe 102 is sufficient to overcome the force applied by the spring 130).

During installation, when the operator pushes on the probe 102 axially with the bayonet 146 in the first portion 122 of the bayonet slot 120, the bellows seal 150 makes contact with sealing surface 140. As a result, the bellows seal 150 forms a seal about the probe 102 within the probe receptacle 108, preventing leakage of gas. Once the bayonet 146 is locked in the notch of the bayonet slot 120, the bellows seal 150 remains in contact with the sealing surface 140.

When removing the probe 102, the operator reverses the order of operations discussed above. It is noted that if the probe receptacle 108 is threaded into a casing 104, the direction in which the probe 102 is turned (clockwise or counterclockwise) is set such that the removal of the probe 102 may tighten the probe receptacle 108 into the casing 104. This prevents accidental loosening of the probe receptacle 108.

The system 100 disclosed herein is generally referred to as a "quick connect/disconnect" system. In some instances, the system 100 enables the probe 102 to be installed deep inside a cavity of the gas turbine engine 106 in which tools, such as wrenches or the like, cannot be used. In addition, the system 100 forms a seal about the probe 102 during installation. Moreover, the system 100 enables an operator to install and/or remove the probe 102 blindly. That is, installation and/or removal of the probe 102 can be completed by feel.

In some instances, gas turbine engines 106 may include multiple casing 104. For example, some gas turbine engines 106 include an outer casing and an inner casing, which may be difficult to access due to space restrictions. The system 100 disclosed herein enables the installation and/or removal of the probe 102 in the inner casing. For example, the handle 152 may pass through a small access port in the outer casing so that the probe 102 may be inserted into and/or removed from the probe receptacle 108 attached to the inner casing.

The system 100 eliminates cross-threading and/or seizing of the probe 102 in the probe receptacle 108. Also, the system 100 provides a positive locking mechanism that prevents the probe 102 from backing out. Further, the system 100 enables for precise positioning of the probe 102 in the axially direction. The probe 102 can be quickly removed for inspection and reinstalled.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for attaching a probe to a casing of a gas turbine engine, the system comprising:
    a probe receptacle attachable to the casing, wherein the probe receptacle comprises an internal bore, a cap comprising a bayonet slot and a spring disposed within the internal bore adjacent to the bayonet slot, and a main body comprising a sealing surface within the internal bore, wherein the probe receptacle comprises a casing seal portion attachable to the casing, wherein the main body is attachable to the casing seal portion, and wherein the cap is attachable to the main body; and
    a probe attachment assembly disposed about the probe and configured to engage the probe receptacle, wherein the probe attachment assembly comprises a bushing and seal disposed about the probe, wherein the bushing comprises at least one bayonet positionable within the bayonet slot, and wherein the seal is positionable adjacent to the sealing surface within the internal bore.

2. The system of claim 1, wherein the spring maintains the bayonet within the bayonet slot.

3. The system of claim 1, wherein the seal seals the sealing surface within the internal bore and functions as the spring.

4. The system of claim 1, wherein the probe receptacle comprises a washer disposed within the internal bore adjacent to the spring.

5. The system of claim 1, wherein the seal comprises a bellows seal.

6. The system of claim 1, wherein the probe attachment assembly comprises a handle for installing the probe into the probe receptacle.

7. The system of claim 1, wherein the bayonet slot is shaped to provide a tactile response based on one or more locations of the bayonet within the bayonet slot.

8. A system for attaching one or more instruments to a casing of a gas turbine engine, the system comprising:
    a probe;
    a probe receptacle attachable to the casing, wherein the probe receptacle comprises an internal bore, a cap comprising a bayonet slot and a spring disposed within the internal bore adjacent to the bayonet slot, and a main body comprising a sealing surface within the internal bore, wherein the probe receptacle comprises a casing seal portion attachable to the casing, wherein the main body is attachable to the casing seal portion, and wherein the cap is attachable to the main body; and
    a probe attachment assembly disposed about the probe and configured to engage the probe receptacle, wherein the probe attachment assembly comprises a bushing and seal disposed about the probe, wherein the bushing comprises at least one bayonet positionable within the bayonet slot, and wherein the seal is positionable adjacent to the sealing surface within the internal bore.

9. A system for attaching a probe to a casing of a gas turbine engine, the system comprising:
    a probe receptacle attachable to the casing, wherein the probe receptacle comprises a casing seal portion attachable to the casing, a main body attachable to the casing seal portion, and a cap attachable to the main body, wherein the cap comprises a bayonet slot and a spring adjacent to the bayonet slot, and wherein the main body comprises a sealing surface; and a probe attachment assembly disposed about the probe and configured to engage the probe receptacle, wherein the probe attachment assembly comprises a bushing and seal disposed about the probe, wherein the bushing comprises at least one bayonet positionable within the bayonet slot, and wherein the seal is positionable adjacent to the sealing surface.

10. The system of claim 9, wherein the spring maintains the bayonet within the bayonet slot.

11. The system of claim 9, wherein the seal seals the sealing surface within the main body.

12. The system of claim 9, wherein the probe receptacle comprises a washer disposed within the main body adjacent to the spring.

13. The system of claim 9, wherein the seal comprises a bellows seal.

14. The system of claim 9, wherein the probe attachment assembly comprises a handle for installing the probe into the probe receptacle.

* * * * *